Aug. 12, 1952     S. M. WECKSTEIN     2,606,799
ADJUSTABLE DOUBLE ROLLER BEARING
Filed Aug. 14, 1950
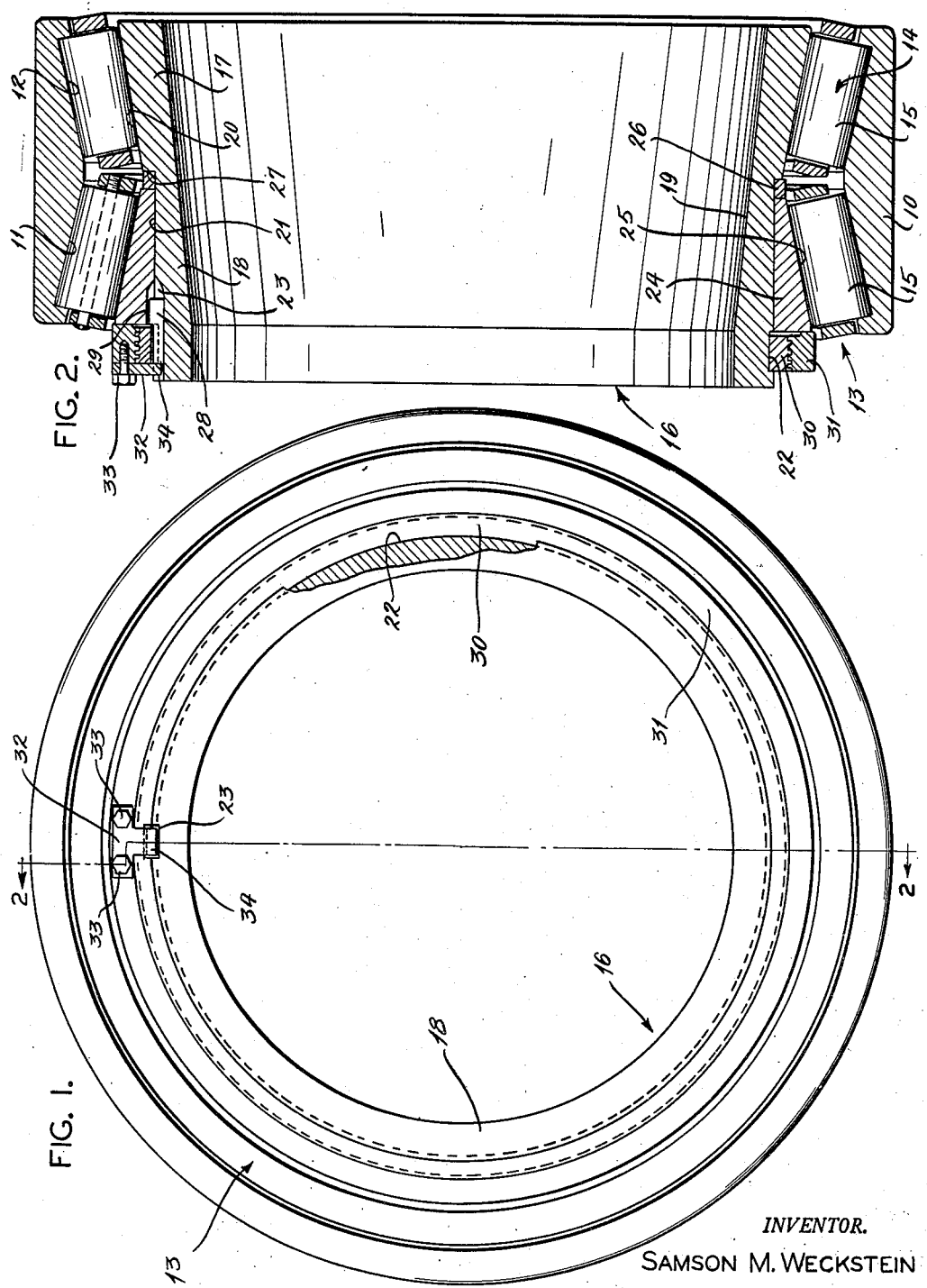
INVENTOR.
SAMSON M. WECKSTEIN
By Carr & Carr & Gravely
ATTORNEYS.

Patented Aug. 12, 1952

2,606,799

UNITED STATES PATENT OFFICE 2,606,799

ADJUSTABLE DOUBLE ROLLER BEARING

Samson M. Weckstein, Canton, Ohio, assignor to The Timken Roller Bearing Company, Canton, Ohio, a corporation of Ohio Application August 14, 1950, Serial No. 179,157

3 Claims. (Cl. 308—214)

This invention relates to roller bearings, and is particularly directed to improvements in the parts of the bearing and in the manner of its assembly.

The principal object of the present invention resides in the provision, in a roller bearing assembly, of an outer bearing member having axially spaced raceways and an inner bearing member comprising separable cones forming the inner raceways for the roller bearings, whereby the separable cones facilitate the assembly of the roller bearing and adapt the same for resisting thrust loads in both axial directions.

Another object of the present invention resides in the provision of means, in a bearing assembly of the above indicated character, which will permit of the easy mounting and adjustment of the separable cone for obtaining alignment of the roller bearings in the assembly.

It is a further object of the present invention to provide a simple and positive means adapted to lock the separable cone in operative relation upon the inner bearing member particularly upon an extension member which in the preferred construction is integral with the inner bearing member.

Other objects and advantages of the present invention reside in the several parts and elements and in their mutual cooperation and manner of assembly.

A preferred form of the present invention, but not necessarily the only form or construction thereof, comprises an outer bearing member or cone having axially spaced raceways formed therein for receiving roller bearings of the tapered type. The inner bearing member of the assembly includes a combined cone and extension member, and the extension is provided with a cylindrical surface adjacent the cone for the mounting of a separable cone in such relation that the cones together provide inner raceways for the roller bearings. The necessary and proper alignment of the inner cones with the roller bearings is provided for by a spacer element which is carried on the cylindrical surface of the extension member for the purpose of maintaining the separable cone in proper spaced relation with the co-acting and relatively fixed cone. The means for securing and properly positioning the separable cone comprises a combination nut having a split ring seated in a channel formed in the extension member and an internally threaded locking ring or nut which is adapted to retain the split ring in position within its channel and in abutment or holding relation with the separable cone. The extension member of the inner bearing member is provided with an axially directed keyway to receive a key element which is adapted to prevent angular displacement or rotation of the separable cone and the split ring. The split ring locking means is held against angular displacement by a second key element which is secured thereto and engages in the keyway. A more explicit understanding of my invention will be had from the following detailed description thereof given in connection with the accompanying drawing, wherein:

Fig. 1 is an end elevational view of the present bearing assembly having a fragmentary portion broken away to show details thereof; and Fig. 2 is a sectional elevational view of the bearing taken at line 2—2 in Fig. 1.

With particular reference to the drawings, the presently preferred roller bearing assembly includes an outer bearing member or cup 10 having the axially spaced bearing raceways 11 and 12 formed therein. In order to provide for resistance to axial thrust in both directions relative to the present bearing assembly, the raceways 11 and 12 are so formed as to provide diverging surfaces. Suitable roller bearings 13 and 14 are adapted to be mounted in the respective raceways 11 and 12 of the outer bearing member or cup. I have shown the roller bearings with tapered roller elements 15 for purposes of present disclosure. It is also preferred that the outer bearing member 10 and the roller bearings 13 and 14 be assembled as a unit prior to their assembly with the remaining portions of the complete bearing.

The inner bearing member 16 of the present assembly comprises an integrally formed cone 17 and an extension member 18. The two parts 17 and 18 are provided with a tapered bore 19 which is adapted to conform with the journal portion of a shaft or other member not shown. The inner bearing member or cone 17 is provided with a raceway 20 which is adapted to cooperate with the roller bearing 14 previously noted. Axially adjacent the cone 17, the extension member 18 is formed with a cylindrical surface 21 having at its outer rim portion an annular groove or channel 22 and at one point on the circumference of the extension 18 there is provided an axially directed slot or keyway 23 which bisects the channel 22.

The cylindrical surface 21 of the extension member 18 is adapted to receive a separable cone or inner bearing member 24 which is formed with a raceway 25 adapted to cooperate with the roller bearing 13 of the assembly. The separable cone 24 is positioned on the cylindrical surface 21 of member 18 in abutment with a spacer ring 26 which, prior to the assembly of member 24, is received on the cylindrical surface 21 in abutting relation with an annular shoulder 27 which is located at the inner margin or small end of the cone 17. The spacer ring 26 may, of course, be of a variable axial dimension in order to determine the proper placement of the cone 24 so that the raceway 25 on cone 24 will have proper alignment with the raceway 11 formed in the outer bearing member or cup 10.

The preferred means for securing the separable cone 24 in fixed position on the extension member 18 includes a key element 28 which is received in the keyway 23. This element 28 is also adapted to engage in a similar axially directed keyway 29 formed in the outer or enlarged end of cone 24, as indicated in Fig. 2. The locking key 28 will not necessarily prevent axial displacement of cone 24 and therefore I have provided a very effective and simple locking arrangement which is adapted to cooperate with the key element 28 and with the annular channel 22 formed in the extension member 18.

The preferred locking arrangement which I have herein disclosed comprises a split ring 30 having threads formed on its outer annular surface and in which the separate ends of the ring are adapted to engage on the opposite faces of the key element 28 when the ring 30 is properly seated in the annular channel or groove 22. Ring 30, therefore, provides an outer abutment adapted to confine the cone 24 between it and the spacer ring 26 previously described. A locking nut or ring member 31 having threads formed on its internal annular surface is adapted to be threaded upon the split ring 30 whereby to retain the split ring within the channel 22 and in non-rotative abutment with the key element 28. In this assembly, key element 28 is called upon to hold the cone 24, as well as the split ring 30, against rotation or angular displacement relative to the extension member 18. The annular nut 31 is adapted to be locked or held against unthreading displacement relative to the split ring 30 by means of a key element 32 which is suitably secured to the outer face of the member 31 by cap screws 33. The key element 32 is provided with a depending tongue 34 which is suitably formed or proportioned to be received in the keyway 23 of the extension member 18. Cap screws 33 may be wired together to prevent loosening due to vibration transmitted to the bearing assembly.

It should now appear in what manner I prefer to construct and assemble my improved bearing, and that I have provided a simple, effective and economical arrangement of parts in a roller bearing assembly which cooperate to permit the attainment of a bearing assembly capable of taking thrust loads in both axial directions. I particularly wish to point out that I have provided simple and economical elements which will provide for the positioning of the separate cone on the extension member for proper running clearance between the raceway thereof and the roller bearing adapted to engage with such raceway.

Having now described my invention in a presently preferred form thereof, I wish it to be understood that I desire to cover all such modifications and equivalents as shall come within the spirit and scope of the appended claims.

What I claim is:

1. In a bearing assembly, an outer bearing member having axially spaced raceways therein, rollers for each raceway, inner bearing members having raceways normally aligned with the raceways in said outer member, an extension member on one of said inner bearing members adapted to support the other of said inner bearing members, a spacer element on said extension member to maintain said normal alignment of raceways, and locking means on said extension member to hold the other of said inner bearing members against axial displacement, said locking means being comprised of a split ring embracing the extension and abutting the other of said inner bearing members, a collar embracing said split ring, and key means for said split ring and collar to prevent relative displacement therebetween.

2. In a bearing assembly, a cup having axially spaced conical raceways therein, rollers mounted in said raceways, separate cones for said rollers, an extension member on one of said cones for the support of another of said cones, a spacer element on said extension and positioned between said cones to limit inward axial movement thereof, a key element engageable with said extension and the cone supported thereon to prevent relative rotation thereof, a ring element on said extension and abutting said supported cone to prevent its outward axial displacement, a collar adapted to retain said ring element in place, and a second key element engaging said extension to prevent relative displacement between said ring element and said collar.

3. A bearing assembly comprising a cup having axially spaced raceways therein, rollers for each such raceway, separate inner bearing members for rollers providing raceways therefor, an extension on a first inner bearing member adapted to support a second inner bearing member, said extension having an axial keyway and an annular channel bisecting said keyway, both remote from said first inner bearing member, a key element in said keyway for locking said second bearing member against rotation, a ring element seated in said annular channel in abutment with said second bearing and also engaging said key, a collar threadedly engaging said ring element to retain the latter in said annular channel, and a second key element secured to said collar and engaging in said keyway to lock said ring and collar against relative rotation.

SAMSON M. WECKSTEIN.

REFERENCES CITED

The following references are of record in the file of this patent:

UNITED STATES PATENTS

| Number | Name | Date |
|---|---|---|
| 1,761,490 | Penner | June 3, 1930 |
| 2,019,464 | Riblet | Oct. 29, 1935 |